(12) United States Patent
Worden et al.

(10) Patent No.: US 9,623,915 B2
(45) Date of Patent: Apr. 18, 2017

(54) STOWABLE TAILGATE HANDLE ASSEMBLY

(71) Applicant: Multimatic Inc., Markham (CA)

(72) Inventors: Scott David Worden, Unionville (CA); Muamer Hodza, Etobicoke (CA); Antonio Costa, Bradford (CA); Geoffrey Lee, Richmond Hill (CA)

(73) Assignee: Multimatic Inc., Markham, Ontario (CA)

( * ) Notice: Subject to any disclaimer, the term of this patent is extended or adjusted under 35 U.S.C. 154(b) by 0 days.

(21) Appl. No.: 14/655,780

(22) PCT Filed: Dec. 18, 2013

(86) PCT No.: PCT/CA2013/050984
§ 371 (c)(1),
(2) Date: Jun. 26, 2015

(87) PCT Pub. No.: WO2014/100900
PCT Pub. Date: Jul. 3, 2014

(65) Prior Publication Data
US 2015/0336622 A1    Nov. 26, 2015

(51) Int. Cl.
*B60R 3/02* (2006.01)
*B62D 33/027* (2006.01)
(Continued)

(52) U.S. Cl.
CPC .......... *B62D 33/0273* (2013.01); *B60R 3/007* (2013.01); *B60R 3/02* (2013.01); *E05D 3/02* (2013.01); *E05D 11/1014* (2013.01)

(58) Field of Classification Search
CPC ....... B62D 33/0273; B60R 3/007; B60R 3/02; B60R 3/005; E05D 11/1014; E05D 11/1007; B60N 3/023
See application file for complete search history.

(56) References Cited

U.S. PATENT DOCUMENTS

| 2,469,242 | A | * | 5/1949 | Pohl | ......................... | B62B 3/02 |
| | | | | | | 280/651 |
| 5,205,603 | A | * | 4/1993 | Burdette, Jr. | ............. | E06C 5/02 |
| | | | | | | 182/195 |

(Continued)

FOREIGN PATENT DOCUMENTS

| CA | 2753790 A1 | 1/2012 |
| CN | 102015370 A | 4/2011 |

(Continued)

OTHER PUBLICATIONS

International Preliminary Report on Patentability issued Jun. 30, 2015 for PCT Application No. PCT/CA2013/050984, 5 pgs.

(Continued)

*Primary Examiner* — J. Allen Shriver, II
*Assistant Examiner* — Steve Clemmons
(74) *Attorney, Agent, or Firm* — Fredrikson & Byron, P.A.

(57) ABSTRACT

A handle assembly is used with a pick-up truck tailgate. The handle assembly comprises a guide tube with an open end, a handle that is housed within the guide tube and a pivot assembly. The pivot assembly comprises a pivot pin connected to one end of the handle and a locking pin. The handle is moveable within the guide tube between a retracted position and an extended position. While in the extended position the handle passes through the open end and the handle may pivot about the pivot pin to move to a support position. When the handle is in the support position, the locking pin can engage the handle and releasably lock the handle in the support position. The guide tube is configured to be secured within a tailgate of a pick-up truck.

15 Claims, 7 Drawing Sheets

(51) Int. Cl.
  *E05D 3/02* (2006.01)
  *E05D 11/10* (2006.01)
  *B60R 3/00* (2006.01)

(56) References Cited

U.S. PATENT DOCUMENTS

| | | | | |
|---|---|---|---|---|
| 5,478,130 | A * | 12/1995 | Matulin | B62D 33/0273 296/51 |
| 6,196,612 | B1 * | 3/2001 | Grimes | B60N 2/3065 293/117 |
| 6,364,392 | B1 * | 4/2002 | Meinke | B62D 33/0273 296/26.1 |
| 6,764,123 | B1 | 7/2004 | Bilyard | |
| 6,857,680 | B2 * | 2/2005 | Fielding | B60N 2/3015 280/166 |
| 6,918,624 | B2 * | 7/2005 | Miller | B60P 3/40 182/127 |
| 6,988,756 | B1 | 1/2006 | Meinke et al. | |
| 7,025,174 | B1 * | 4/2006 | Hawley | E06C 5/04 182/127 |
| 7,090,276 | B1 | 8/2006 | Bruford et al. | |
| 7,201,385 | B2 * | 4/2007 | Renz | B62B 3/02 280/47.34 |
| 7,213,856 | B2 | 5/2007 | Katada | |
| 7,240,947 | B2 * | 7/2007 | Kuznarik | B62D 33/0273 180/127 |
| 7,462,009 | B2 * | 12/2008 | Hartmann | B62B 5/049 280/47.371 |
| 7,488,021 | B1 * | 2/2009 | Roos | B60P 3/40 296/26.11 |
| 7,516,997 | B2 * | 4/2009 | Kuznarik | B62D 33/0273 182/127 |
| 7,530,619 | B1 | 5/2009 | Bruford et al. | |
| 7,896,419 | B2 * | 3/2011 | Elliott | B60R 3/007 280/166 |
| 8,251,423 | B1 * | 8/2012 | Lingle | B60R 3/00 296/1.02 |
| 8,552,852 | B1 * | 10/2013 | Hertz | B60P 3/40 340/468 |
| 8,613,475 | B1 * | 12/2013 | Statz | B60R 3/007 296/1.02 |
| 8,678,457 | B1 * | 3/2014 | Duderstadt | B60R 3/00 16/429 |
| 9,302,719 | B1 * | 4/2016 | Krishnan | B60R 3/02 |
| 2004/0227368 | A1 | 11/2004 | Seksaria et al. | |
| 2006/0220334 | A1 * | 10/2006 | Liao | B62B 1/002 280/47.34 |
| 2012/0104721 | A1 * | 5/2012 | Genest | B60R 3/02 280/166 |

FOREIGN PATENT DOCUMENTS

RU 19012 U1 8/2001
WO 2006060303 A2 6/2006

OTHER PUBLICATIONS

PCT International Search Report dated Feb. 27, 2014 for Intl. App. No. PCT/CA2013/050984, from which the instant application is based, 3 pgs.
European Patent Application No. 13869840.2, Extended European Search Report mailed Jul. 11, 2016, 7 pages.

* cited by examiner

United States Patent

US 9,623,915 B2

STOWABLE TAILGATE HANDLE ASSEMBLY

RELATED APPLICATIONS

This application is a 35 U.S.C. 371 national stage filing from International Application No. PCT/CA2013/050984, filed Dec. 18, 2013, and claims priority to Canadian Application No. 2800070, filed Dec. 28, 2012, the teachings of each of which are incorporated herein by reference.

FIELD

This disclosure relates to pick-up truck tailgates and to handles for pick-up truck tailgates.

BACKGROUND

U.S. Pat. No. 7,530,619 to Bruford et al. describes a grab handle for use with a tailgate on pick-up trucks. This grab handle is oriented to pivot at one end between a stowed position and an operational position. While in the stowed position, the grab handle is parallel to an inner surface of the tailgate and is recessed below a top of the inner surface so as not to interfere with the normal operation of the tailgate. When in the operational position, the grab handle is perpendicular to the inner surface of the tailgate so that when the tailgate is opened, the grab handle provides support for a user. The pivot end of the grab handle includes a spring loaded latch mechanism that biases a tip extension past the end of the grip handle. When in the stowed position, the extended tip abuts a retainer ridge, which prevents pivoting of the grip handle from the stowed position. When in the operational position, the extended tip is received and held in a striker plate, below the grip handle, to prevent unwanted pivoting from the operational position. The tip can be retracted from the extended position by a spring-loaded latch handle to allow the grip handle to pivot between the stowed position and the operational position.

SUMMARY OF THE INVENTION

A handle assembly for a pick-up truck tailgate is described herein. The handle assembly comprises a guide tube with an open end, a handle that is movably housed within the guide tube and a pivot assembly. The pivot assembly comprises a pivot pin connected to one end of the handle and a locking pin. The handle is moveable within the guide tube between a retracted position and an extended position. While in the extended position the handle passes through the open end and the handle may pivot about the pivot pin to move to a support position. When the handle is in the support position, the locking pin may engage the handle and releasably lock the handle in the support position. The guide tube is configured to be secured within a tailgate of a pick-up truck. The handle assembly may pass through an opening in the top surface of the tailgate for storage or use, as required.

DETAILED DESCRIPTION

Figure 1A:
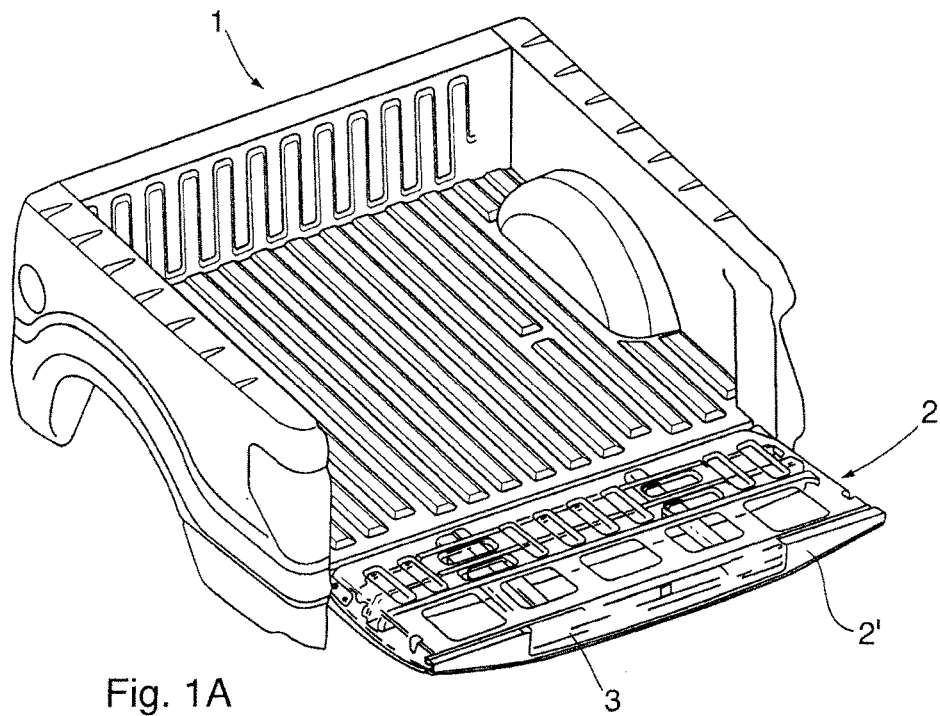
FIG. 1A is an isometric view of a truck box and a tailgate for use with a pick-up truck.
Figure 1B:
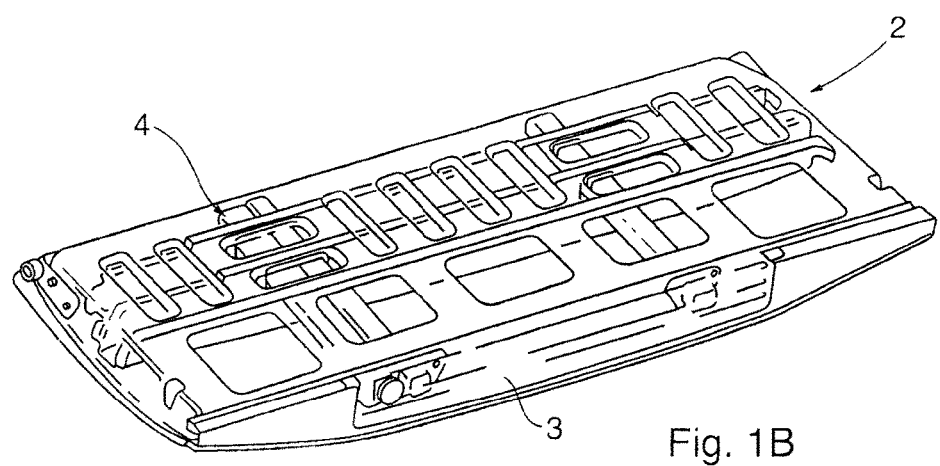
FIG. 1B is an isometric view of the tailgate of FIG. 1A with an example handle assembly housed within the tailgate.
Figure 2A:
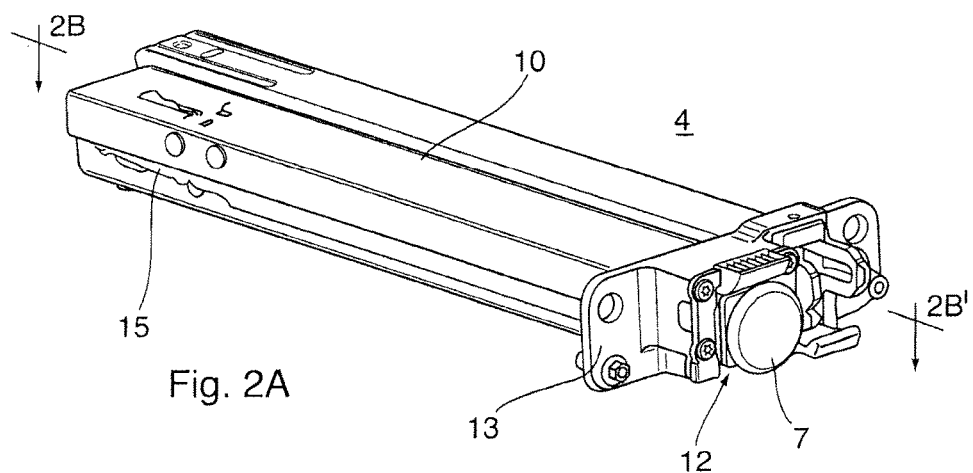
FIG. 2A is an isometric view of the handle assembly of FIG. 1B.
Figure 2B:
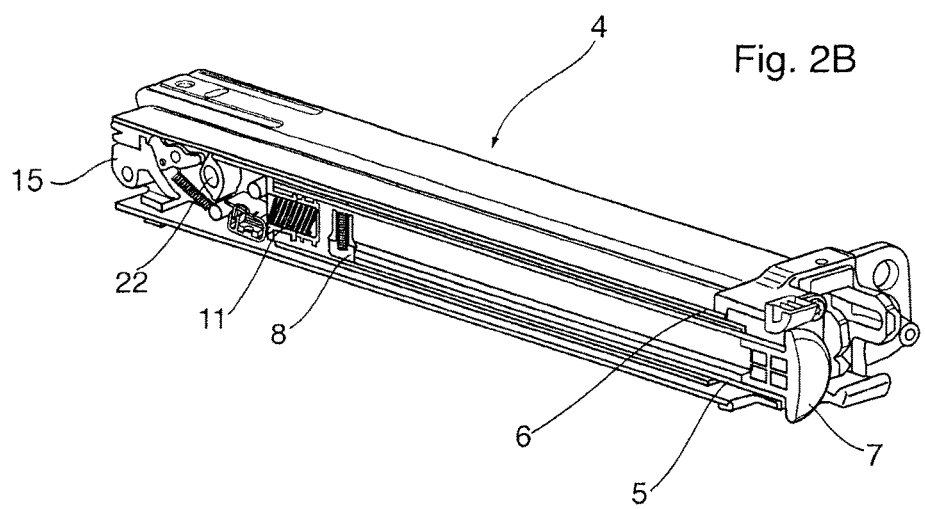
FIG. 2B is a cross-sectional view of the handle assembly of FIG. 2A, taken along line 2B-2B' in FIG. 2A.
Figure 3A:
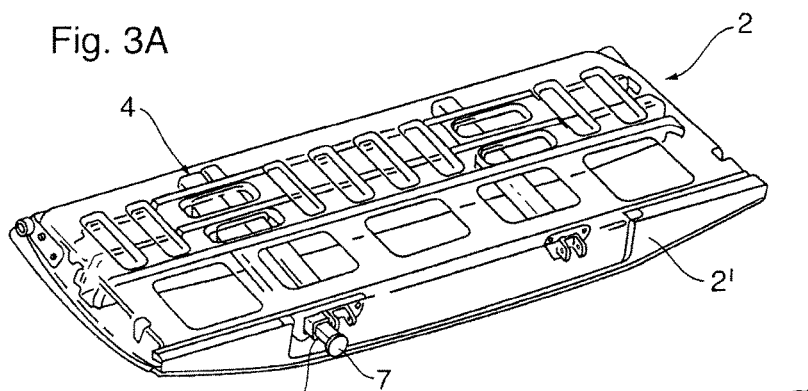
FIG. 3A is an isometric view of the handle assembly of FIG. 2A with a handle portion in a retracted position.
Figure 3B:
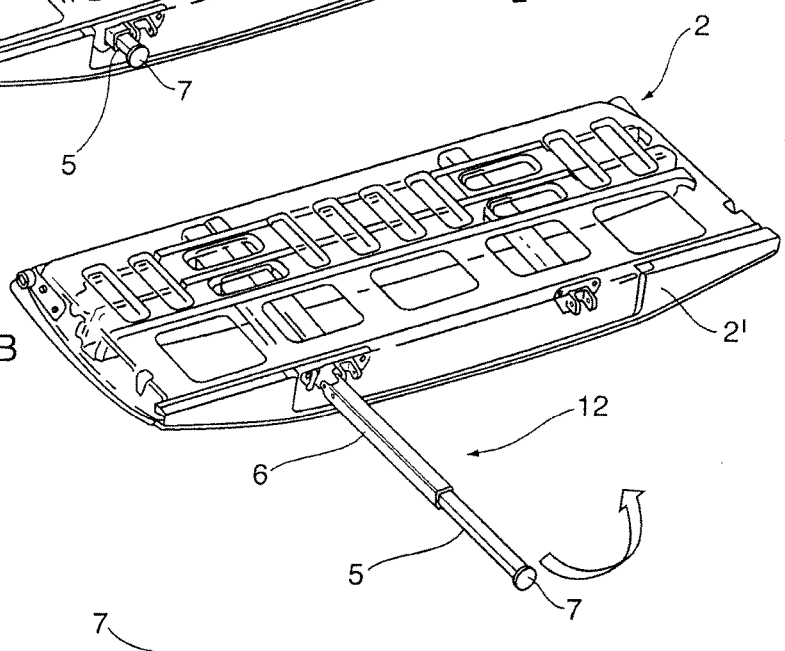
FIG. 3B is an isometric view of the handle portion of FIG. 3A in an extended position.
Figure 3C:
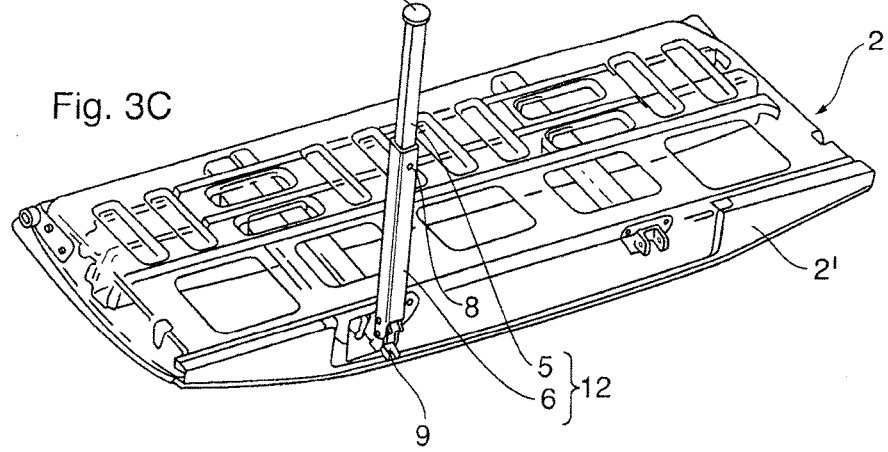
FIG. 3C is an isometric view of the handle portion of FIG. 3B in a support position.

FIG. 1A depicts a truck box 1 of a pick-up truck with a tailgate 2 in an open position. The example of FIG. 2B depicts a handle assembly 4 housed within the tailgate 2.
FIGS. 2A and 2B depict an example handle assembly 4 that comprises a guide tube 10, a handle portion 12 and a pivot assembly 15. The guide tube 10 is hollow with a first open end and a second end. The ends define a longitudinal axis of the guide tube 10. The guide tube 10 can be secured within the tailgate 2, by various known methods, and oriented with the first open end towards a top surface 2' of the tailgate 2 as shown in FIGS. 3A, 3B and 3C. The second end of the guide tube 10 can be open or not. The guide tube 10 can have a variety of cross-sectional shapes including circular, elliptical, triangular, rectangular or square. Preferably the guide tube 10 has a rectangular cross-sectional shape. The handle portion 12 is positioned within the guide tube 10 and the handle portion 12 may have the same cross-sectional shape as the guide tube 10, or not. The handle portion 12 can move along the longitudinal axis of the guide tube 10 and exit the guide tube 10 at the first open end. For example, the handle portion 12 can telescopically slide between a retracted position (depicted in FIG. 3A) and an extended position (depicted in FIG. 3B). Although reference is made to sliding movements, other forms of movement along the longitudinal axis of the guide tube 10 are contemplated as well. In the retracted position, the majority of, or all of, the handle portion 12 can be housed within the guide tube 10. In the extended position, the majority of, or all of, the handle portion 12 is outside the guide tube 10.

Figure 4A:
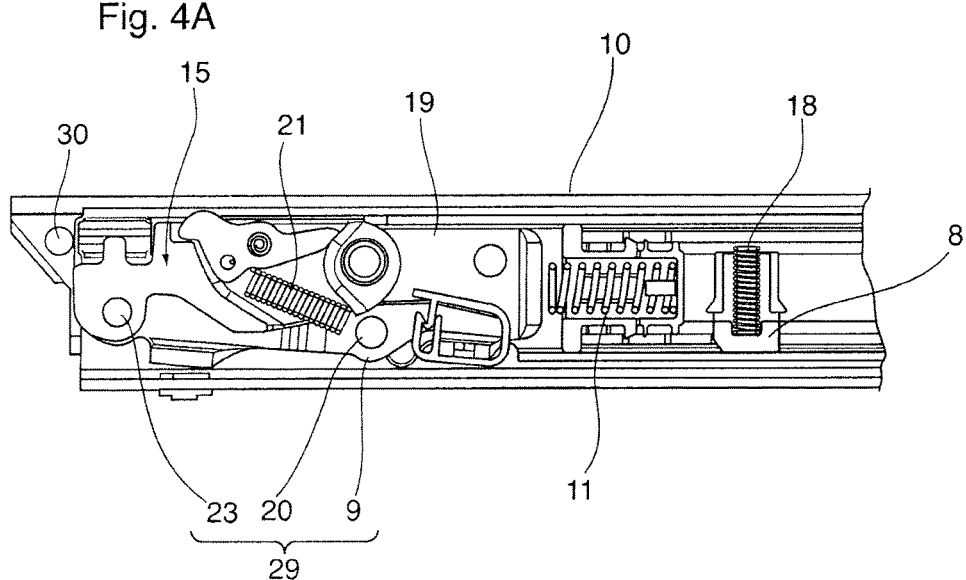
FIG. 4A is a mid-line, sectional side view of an example pivot assembly.
Figure 4B:
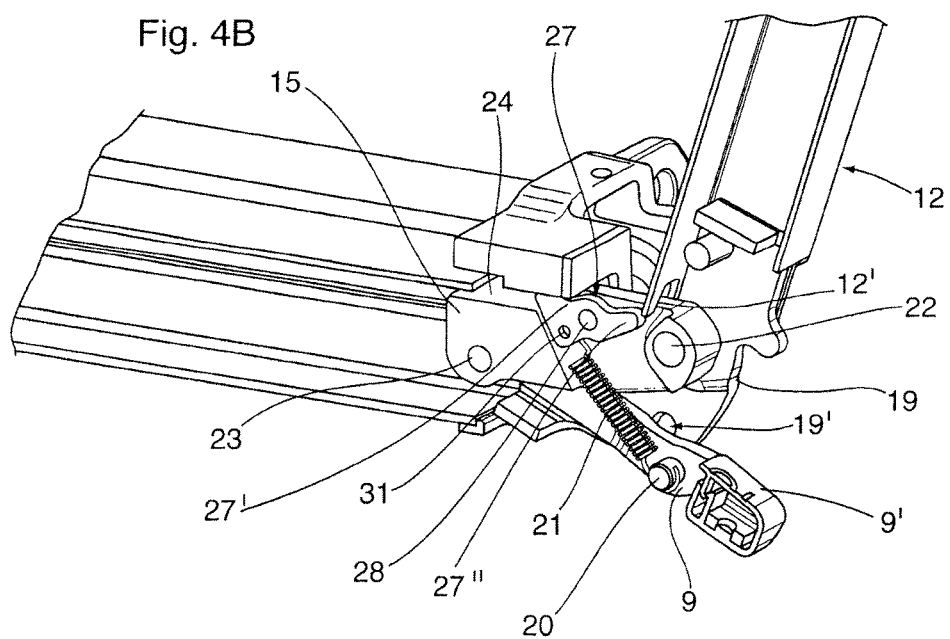
FIG. 4B is an isometric view of an example pivot assembly when the handle portion is between the extended position and the support position.

As best illustrated in FIGS. 2A, 4A and 4B, the pivot assembly 15 comprises a pivoting connection with the handle portion 12, a locking pin 20 and, optionally, has one or more guiding surfaces 24, illustrated in FIG. 2B. The guiding surfaces 24 can be arranged to contact the inner surface of the guide tube 10 and allow the pivot assembly 15 to move along the longitudinal axis of the guide tube 10. The pivot assembly 15 is pivotally connected to the end of the handle portion 12 that is distal to the first open end of the guide tube 10. While various pivoting connections are contemplated, preferably a pivot pin 22 forms the pivotable connection between the handle portion 12 and the pivot assembly 15. When the handle portion 12 is in the retracted position, the pivot assembly 15 can be positioned close to, or abut, the second end of the guide tube 10. When the handle portion 12 is in the extended position, the pivot assembly 15 can be positioned near the open end of the guide tube 10. Optionally, the first open end of the guide tube 10 may include a mounting bracket 13 with a receiving surface such as a shoulder, tab, flange or similar structure that extends into the hollow opening of the guide tube 10. When the handle portion 12 is in the extended position, one or more of the guiding surfaces 24 engages the receiving surfaces of the mounting bracket 13 to prevent the entire pivot assembly 15 from moving past the mounting bracket 13. The receiving surfaces may be oriented so that the sliding movement of the handle portion 12 between the retracted and extended positions is not impinged.

Figure 4C:
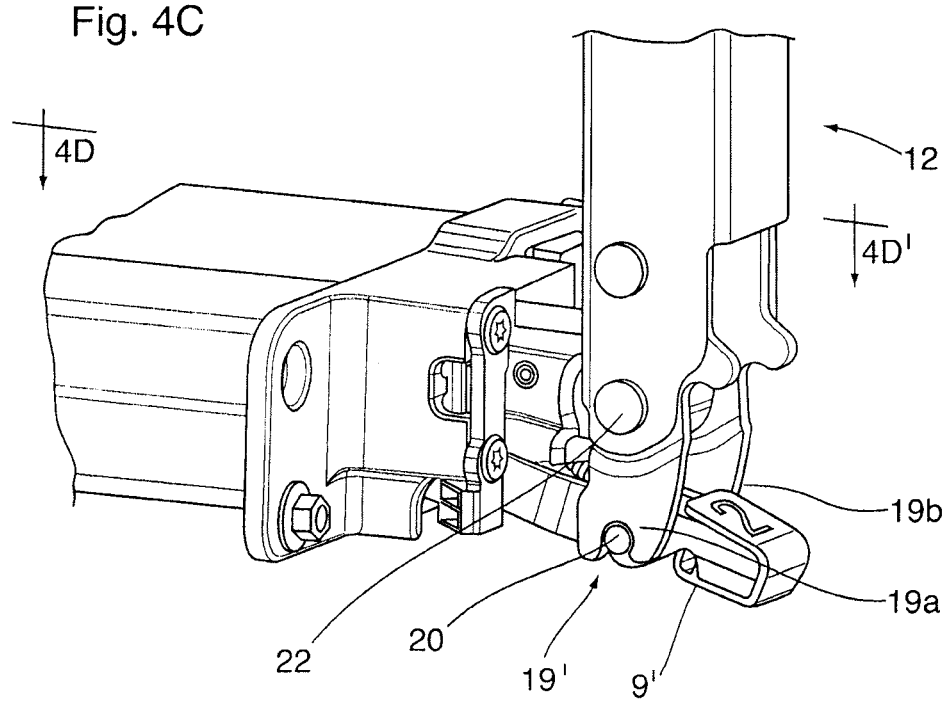
FIG. 4C is an isometric view of the pivot assembly of FIG. 4B when the handle portion is in the support position.

When the handle portion 12 is in the extended position, it can pivot about the pivot pin 22 and move to a support position (depicted in FIG. 3C). For example, when the handle portion 12 is in the support position, it is substantially perpendicular to the longitudinal axis of the guide tube 10. Preferably, the end of the handle portion 12 that is pivotally connected to the pivot assembly 15 and the pivot assembly 15 are configured to allow the handle portion 12 to rotate about the pivot pin 22 in one direction only (see arrow in FIG. 3B). In the example of FIG. 4B, the handle portion 12 includes a locking fork 19 that extends past the pivot pin 22 towards the pivot assembly 15. As shown in the example of FIG. 4C, the locking fork 19 may have two arms 19a, 19b positioned on either side of the pivot assembly 15. Optionally, the locking fork 19 may comprise a different number of arms and take different configurations relative to the pivot assembly 15. When the handle portion 12 is in the extended position, or between the retracted position and the extended position, the handle portion 12 may be configured to prevent it from rotating away from the support position. For example, the pivot fork 19 may abut either the pivot assembly 15, or a portion of the mounting bracket 13. In the orientation of FIG. 4B, the locking fork 19 may prevent the handle portion 12 from rotating downward.

Also depicted in the example of FIG. 4B is a locking notch 19' positioned on a distal edge of each arm 19a, 19b of the locking fork 19. The locking notch 19' can releasably engage a locking pin 20. The locking pin 20 may be fixed at one end to one of the guide tube 10, the pivot assembly 15, the mounting bracket 13, the top surface 2' or another part of the tailgate 2 or the handle assembly 4. When the locking pin 20 is engaged within the locking notch 19', the handle portion 12 cannot pivot any further about the pivot pin 22 and the handle portion 12 is locked in the support position. In this configuration, the locking pin 20 may be referred to as being in a locked position. The locking pin 20 can be held in the locked position within the locking notch 19' by friction fit, snap fit or other suitable releasable means.

Optionally, the pivot assembly 15 further includes a lock assembly 29. FIG. 4A depicts a mid-line, cross-sectional view of the pivot assembly 15 with the lock assembly 29, when the handle portion is in the retracted position. The lock assembly 29 comprises a release lever 9, the locking pin 20 and a lock pivot pin 23. When the handle portion 12 is in the retracted position, the lock assembly 29 can be contained within the hollow cross-sectional area of the guide tube 10 and not impinge on any movement of the handle portion 12 or the pivot assembly 15 along the longitudinal axis of the guide tube 10. FIG. 4B depicts the pivot assembly 15 and the lock assembly 29 when the handle portion 12 (shown as a partial sectional view in FIG. 4B) is between the extended position and the support position. One end of the release lever 9 may be pivotally connected to the pivot assembly 15 by the lock pivot pin 23. In this option, the locking pin 20 may be fixed to, and extend away from, the release lever 9. For example, the locking pin 20 may extend perpendicular to the longitudinal axis of the handle assembly 4 and the locking pin 20 can be configured to engage the locking notch 19' to lock the handle portion 12 in the support position.

Optionally, the lock assembly 29 can further comprise a lock biasing member 21 that biases the release lever 9 to a position close to the body of the pivot assembly 15. In the examples of FIGS. 4A and 4B, the lock biasing member 21 can be an extension spring with one end fixed to the body of the pivot assembly 15 at a position above the release lever 9 and the other end of the spring connected to the locking pin 20. Alternatively, the other end of the lock biasing member 21 can be connected to the release lever 9 at a position proximal to the locking pin 20. The lock biasing member 21 exerts a biasing force on the release lever 9 to pull it upwards towards the body of the pivot assembly 15.

The release lever 9 can be moved to the locked position. While in the locked position, the locking pin 20 engages the lock notch 19' and prevents further rotation of the handle portion 12. Optionally, the biasing force of the lock biasing member 21 helps keep the locking pin 20 in the locked position. When the locking pin 20 is disengaged from the locked position, the handle portion 12 may be rotated from the support position back to the extended position.

In operation, the handle portion 12 can be pulled from the retracted position (FIG. 3A) to the extended position (FIG. 3B) and rotated about the pivot pin 22 to the support position (FIG. 3C). As the handle portion 12 is rotated from the extended position to the support position, the locking fork 19 also rotates about the pivot pin 22 and the locking pin 20 moves along an outer edge of the locking fork 19 causing the release lever 9 to move against the biasing force of the lock biasing member 21 (see FIG. 4B). As the handle portion 12 continues to rotate and achieves the support position, the locking pin 20 may engage the lock notch 19' and achieve the locked position, optionally, with the assistance of the biasing force exerted by the lock biasing member 21. When the handle portion 12 is no longer desired to be locked in the support position, the lock assembly 29 can be disengaged from the locked position by moving the release lever 9 away from the locking notch 19'. Optionally, the release lever 9 may include a release lever extension 9' and a user may depress the release lever extension 9' in a downward motion. For example, a user may press on the release lever extension 9', to move the release lever 9 away from the locking notch 19' and disengage the locking pin 20 from the locking notch 19'. When the locking pin 20 is disengaged, the handle portion 12 can be rotated about the pivot pin 22 back to the extended position. From the extended position, the handle portion 12 and the pivot assembly 15 can be pushed back into the guide tube 10.

In one variation of the handle apparatus 4, the handle portion 12 comprises an outer handle 6 and an inner handle 5. At least part of the inner handle 5 may be moveably housed within the outer handle 6. The inner handle 5 can move through an open end of the outer handle 6, between a retracted and an extended position. Optionally, an end of the inner handle 5 that is not housed within the outer handle may include a grip handle 7 (see FIGS. 3A, 3B and 3C).

As another option of the handle portion 12, a release button 8 may be positioned within the inner handle 5. The release button 8 is positioned opposite an inner release button aperture in the wall of the inner handle 5. The release button 8 can include a release biasing member 18 that biases the release button 8 to extend through the inner release button aperture in the wall of the inner handle 5. For example, the release biasing member 18 can be a compression spring. The wall of the outer handle 6 includes an outer release button aperture. When the inner handle 5 is in the fully extended position, the inner release button aperture may align with the outer release button aperture and the release button 8 can extend through both apertures. When the release button 8 is in this extended position, the inner handle 5 is locked in the extended position and any further sliding movement is prevented until the release button 8 is depressed against the biasing force of the release biasing member 18.

Optionally, the inner handle 5 and the outer handle 6 may include a stopping means for preventing the inner handle 5 from extending all the way past the open end of the outer handle 6. The stopping means can comprise a set of flanges, shoulders or tabs on the outer surface of the inner handle 5 and on the inner surface of the outer handle 6 that abut each other when the inner handle 5 approaches the open end of the outer handle 6. Alternatively, the stopping means may include various other suitable configurations.

As one option of the tailgate 2, the top surface 2' of the tailgate 2 includes a cover 3 (see FIG. 1A). The cover 3 may be pivotally connected to the top surface 2', for example by one or more pin and hinge arrangements so that the cover 3 can move between an open and a closed position over the first open end of the guide assembly 10. The cover 3 can be held in the closed position by latch, friction fit, snap fit or other suitable releasable closing means. In this option, the handle assembly 4 may further include a pre-load biasing member 11 positioned between the pivot assembly 15 and the handle portion 12. For example, the pre-load biasing member 11 may provide a biasing force that pushes the inner handle towards the extended position. While in the retracted position, the pivot assembly 15 may abut the second end of the guide tube 10. As shown in the example of FIG. 4A, the pivot assembly 15 is abutting a stop pin 30. The stop pin 30 is fixed to the guide tube 10 and prevents the pivot assembly 15 from moving further away from the first open end of the guide tube 10. When the cover 3 is in the closed position, the pre-load biasing member 11 pushes the inner handle 5 against the inner surface of the cover 3. When the cover is moved to the open position, the inner handle 5 moves outward from the first open end of the guide tube 10 to provide the user easy access to the grip handle 7. When the user no longer requires the handle portion 12 in the support position, the user can disengage the locking pin 20, rotate the handle portion 12 to the extended position, push the handle portion 12 into the guide tube 10 and close the cover 3. In this position, the inner handle 5 will then compress the pre-load biasing member 11 to generate a new biasing force. The releasable closing means can hold the cover 3 in the closed position against this biasing force.

Figure 4D:
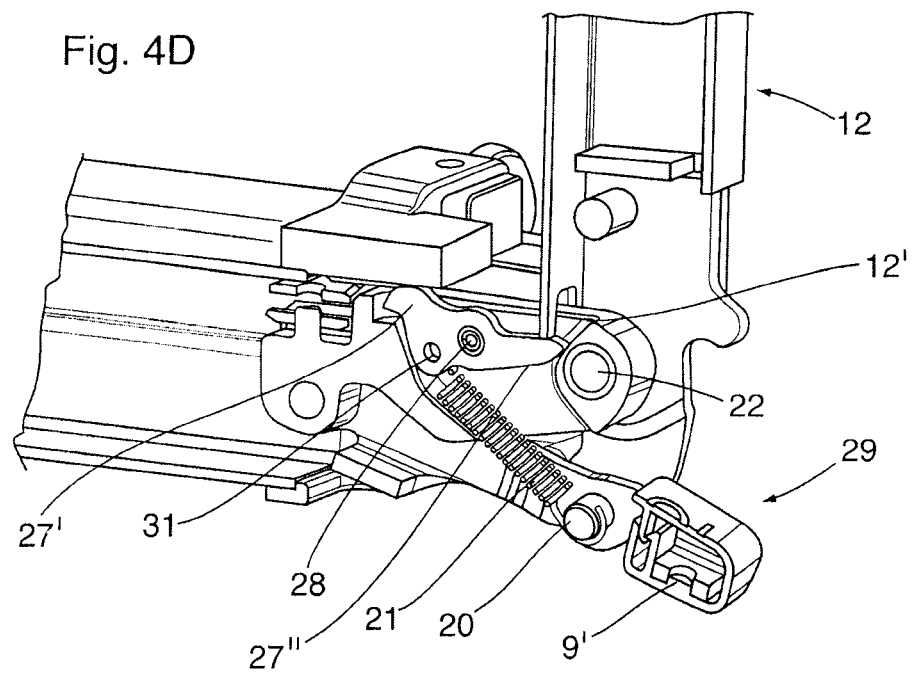
FIG. 4D is a sectional view taken along line 4D-4D' in FIG. 4C.

In another option of the handle assembly 4, the pivot assembly 15 further includes a tension link member 27. As shown in the example of FIG. 4B, the tension link member 27 comprises two opposing tabs 27', 27", a central tension link pin 28 and an aperture 31 positioned below the tension link pin 28. The tension link pin 28 can provide an axis of rotation about which the tension link member 27 may rotate. The end of the lock biasing member 21 that is opposite to the locking pin 20 may be connected with the aperture 31. As the tension link member 27 rotates about the tension link pin 28, the aperture 31 may move and cause the lock biasing member 21 to extend or retract. Extending the lock biasing member 21 may increase the amplitude of the biasing force of the lock biasing member 21, which may increase the amplitude of the force that holds the locking pin 20 in the locked position within the locking notch 19'. In this option, the handle portion 12 may include an extension 12' that may contact the tab 27" of the tension link member 27. For example, as the handle portion 12 rotates about the pivot pin 22 towards the support position, the extension 12' rotates into contact with the tab 27" and pushes the tab 27" downward. This downward movement causes the tension link number 27 to rotate and the aperture 31 moves to extend the locking biasing member 11. At the same time, the opposing tab 27' moves upward to contact and engage a fixed surface, for example an inner surface of the guide tube 10 (see FIG. 4D) or an inner surface of the mounting bracket 13. When the tab 27' engages the fixed surface, any force exerted on the handle portion 12 that is substantially in the direction of rotating the handle portion 12 towards the support position, will transmit through the tension link member 27 to the fixed surface. The combination of the locking pin 20 engaging the locking fork 19 in the locked position and the contact of the tension link member 27 on the fixed surface may further stabilize the handle portion 12 while it is in the support position.

Figure 5:
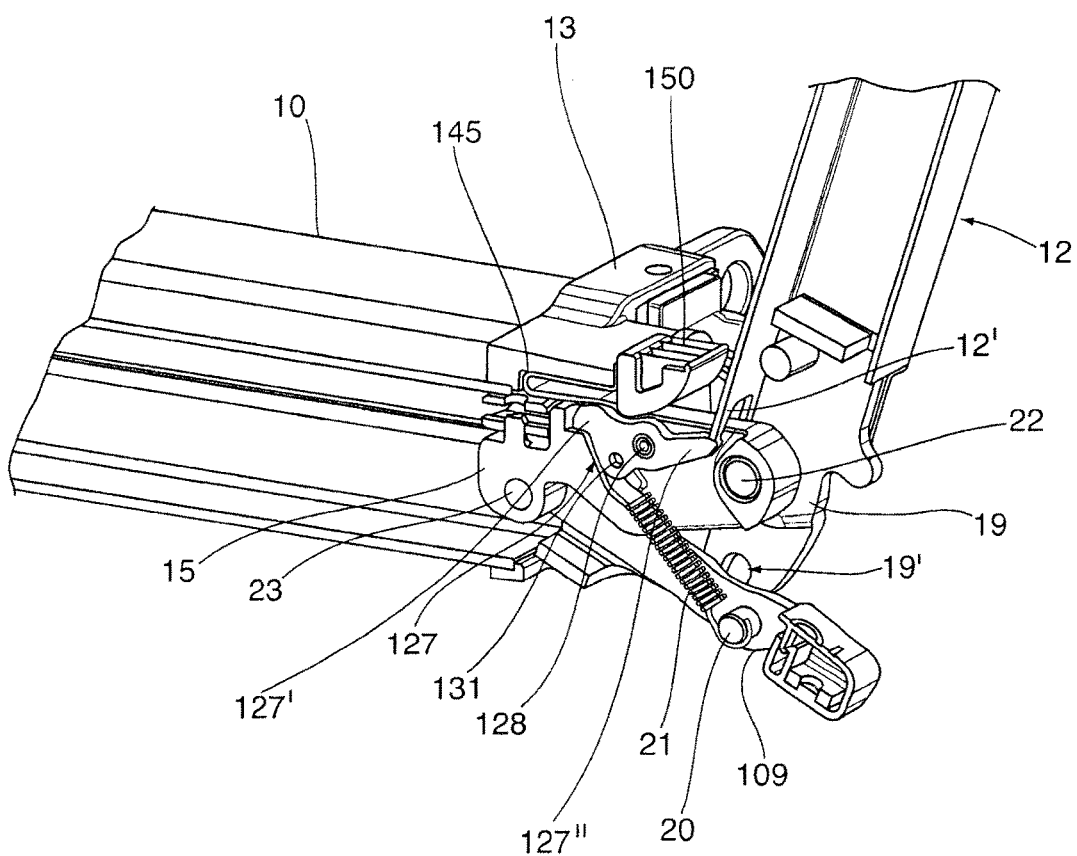
FIG. 5 is a sectional side view of an alternative tension link member for use with the pivot assembly of FIGS. 4A, 4B and 4C.

In an alternative option of the handle assembly 4, the pivot assembly 15 may comprise a tension link member 127 and a compensator 145. Optionally, the compensator 145 may also be referred to as a gap compensator, a tolerance compensator and a clearance compensator. As shown in the example of FIG. 5, the tension link member 127 comprises two opposing tabs 127', 127", a tension link pin 128 and an aperture 131 positioned below the tension link pin 128. The tension link pin 128 can provide an axis of rotation about which the tension link member 127 rotates. The end of the lock biasing member 21 that is opposite to the locking pin 20 is connected to the aperture 131. As the tension link member 127 rotates about the tension link pin 128, the aperture 131 moves and causes the lock biasing member 21 to extend or retract. Extending the lock biasing member 21 may increase the amplitude of the biasing force of the lock biasing member 21, which may increase the amplitude of the force that holds the locking pin 20 in the locked position within the locking notch 19'. In this option, the handle portion 12 may include an extension 12' that contacts the tab 127" of the tension link member 127. For example, as the handle portion 12 rotates about the pivot pin 22 towards the support position, the extension 12' rotates into contact with the tab 127" and pushes the tab 127" downward. This downward movement causes the tension link member 127 to rotate and the aperture 131 moves to extend the locking biasing member 11.

The compensator 145 is positioned between the tension link member 127 and the inner surface of the guide tube 10 or an inner surface of the mounting bracket 13 (see FIG. 5). When the handle portion 12 is in the extended position, the compensator 145 establishes and maintains contact with the tension link member 127. This contact may compensate for a gap, also referred to as a tolerance or a clearance, which is defined between the pivot assembly 15 and the guide tube 10, or between the pivot assembly 15 and the mounting bracket 13. The dimensions of the gap may be predetermined during manufacturing, for example to facilitate the sliding movement of the handle portion 12 through the guide tube 10, or the dimensions of the gap may vary, for example if the handle assembly 4 is damaged. The compensator 145 maintains contact with the tension link member 127, which may contribute to the overall stability and rigidity of the handle assembly 4 when the handle portion 12 is in the extended position. Optionally, the compensator 145 is resilient, for example the compensator 145 may be a flat spring that is shaped to maintain contact with the tension link member 127 when the handle portion 12 is in the extended position.

In another option of the handle assembly 4, the mounting bracket 13 may include a resilient stopper 150 (see FIG. 5). The resilient stopper 150 may be made from various suitable resilient materials, such as polyamide or acetal. The resilient stopper 150 may be fixed to the guide tube 10, for example to the open end of the guide tube 10 or the mounting bracket 13. The resilient stopper 150 may be fixed in one or more positions that prevent the handle portion 12 from making direct contact with the mounting bracket 13, any other portion of the guide tube 10 and the tailgate 2, while the handle portion 12 is in the support position.

Figure 6A:
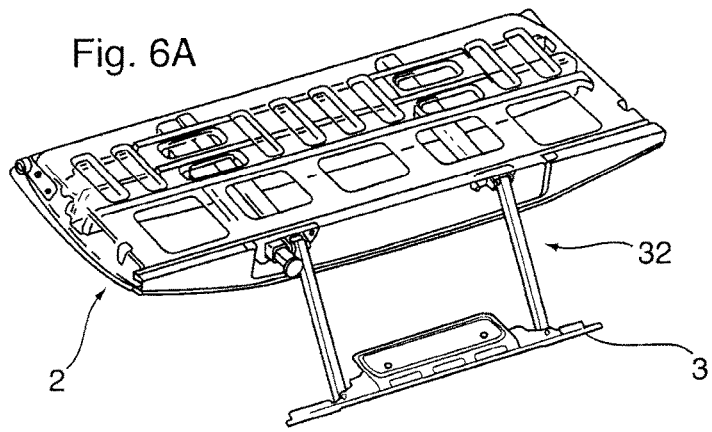
FIGS. 6A, 6B and 6C are isometric views of an example handle assembly and an example tailgate step assembly for use with a pick-up truck tailgate.
Figure 6B:
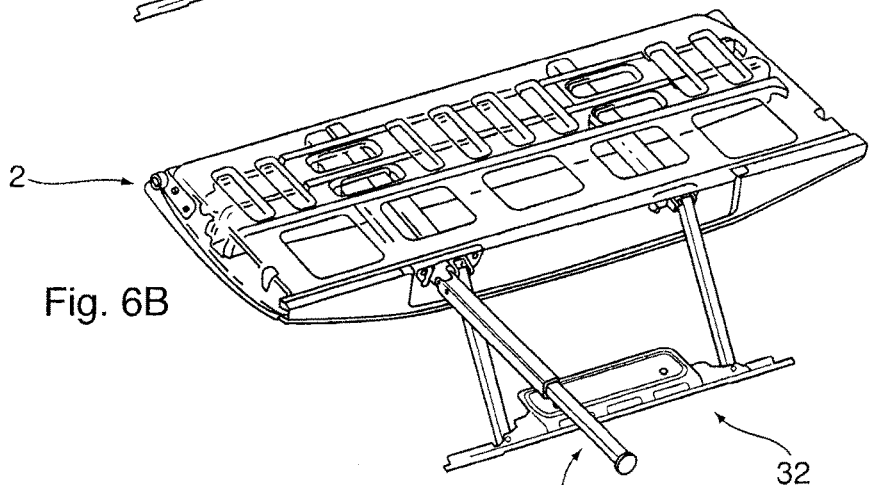
Figure 6C:
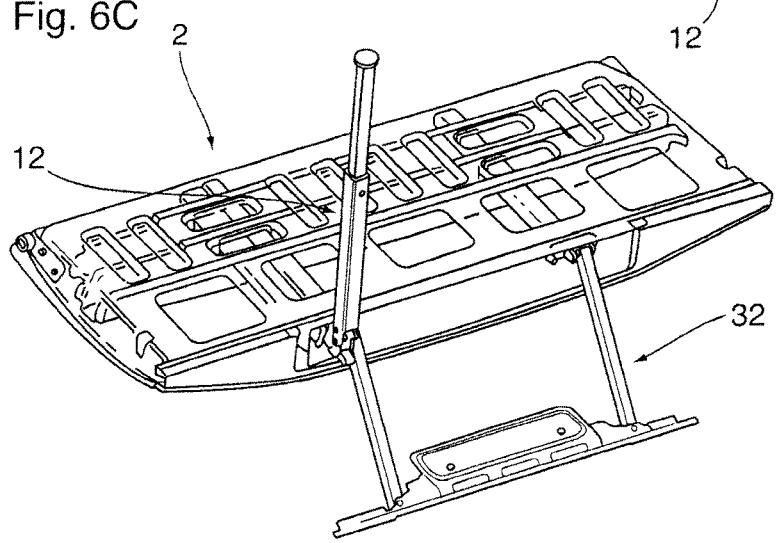

In another option of the handle assembly 4, a step assembly 32 may also be stowed within the tailgate 2. For example, the step assembly described in U.S. Pat. No. 7,530,619 to Bruford is suitable, the entirety of Bruford is incorporated herein by reference. In the example of FIGS. 6A, 6B and 6C, the step assembly 32 may comprise one or more support members that extend from the top surface 2' of the tailgate 2 to support a step feature. When the tailgate 2 is open, the step assembly 32 can be placed into a step position with the step feature supported below the tailgate 2. In the step position, the step feature provides a surface for a user to step onto when ascending or descending from the truck box 1, via the tailgate 2. As shown in FIG. 6A, the cover 3 may be incorporated into the step assembly 32, so that when the step assembly 32 is in the step position, the grip handle 7 is readily accessible for a user to grab and pull the handle portion 12 into the extended position (FIG. 6B) and then to rotate the handle portion 12 into the support position (FIG. 6C). In the support position, the handle portion 12 is positioned proximal to the step assembly 32 and available to assist the user to ascend or descend from the truck box 1.

In another option of the handle assembly 4, the guide tube 10 is formed as an integrated housing within the tailgate 2. In this option, the guide tube 10 receives the handle portion 12 and the pivot assembly 15. The mounting bracket 13 may be secured to the top surface 2' of the tailgate 2 to retain the pivot assembly 15 therein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art.

What is claimed is:

1. A handle assembly for a pick-up truck tailgate, the handle assembly comprising:
    a guide tube with an open end;
    a handle that is received within the guide tube; and
    a pivot assembly that comprises a locking pin and a pivot pin, wherein the pivot pin is connected to one end of the handle and wherein the pivot assembly is received within the guide tube, the pivot assembly further comprising a tension link member that is rotatably connected to the pivot assembly;
    wherein the handle is moveable within the guide tube between a retracted position and an extended position, and in the extended position the handle passes through the open end of the guide tube and the handle is pivotable about the pivot pin to move to a support position;
    wherein when the handle is in the support position, the locking pin releasably locks the handle in the support position, and the handle portion engages the tension link member and rotates the tension link member to contact a fixed surface or a tolerance compensator; and
    wherein the guide tube is configured to be secured within the tailgate of the pick-up truck.

2. The handle assembly of claim 1, wherein the pivot assembly further comprises a release lever and a biasing member, wherein the release lever is pivotally connected at one end to the pivot assembly and the biasing member is connected at a first end to the pivot assembly and connected at a second end to the release lever, distal from the pivotally connected end of the release lever, and wherein the locking pin is fixed to the release lever.

3. The handle assembly of claim 2, wherein the second end of the biasing member is connected to the tension link member and wherein when the tension link member rotates, the biasing member is extended.

4. The handle assembly of claim 1 wherein the second end of the biasing member is connected to the tension link member and wherein when the tension link member rotates, the biasing member is extended.

5. The handle assembly of claim 1, wherein the handle portion comprises an inner handle and an outer handle, wherein the inner handle is moveably housed within the outer handle.

6. The handle assembly of claim 5, wherein the pivot assembly further comprises a pre-load biasing member that abuts an end of the inner handle.

7. The handle assembly of claim 5, wherein the handle portion further comprises a release button that releasably locks the inner handle in the extended position.

8. The handle assembly of claim 1, wherein the tailgate further comprises a cover that movably covers the open end of the guide tube.

9. The handle assembly of claim 8, wherein the handle portion further comprises an inner handle and a release button that releasably locks the inner handle in the extended position.

10. The handle assembly of claim 1, wherein the handle portion is slidably moveable within the guide tube.

11. The handle assembly of claim 1, wherein the tailgate further comprises a step assembly.

12. The handle assembly of claim 1, further comprising a mounting bracket that is securable to the tailgate and abuts a guiding surface of the pivot assembly when the handle portion is in both the extended position and the support position.

13. The handle assembly of claim 1, further comprising a resilient stopper that is fixed to the guide tube for preventing contact between the guide tube and the handle when the handle is in the support position.

14. A tailgate for a pick-up truck comprising a handle assembly housed within the tailgate, the handle assembly comprising:
    a handle;
    a pivot assembly that comprises a pivot pin and a locking pin, wherein the pivot pin is connected to one end of the handle; and
    a tension link member that is rotatably connected to the pivot assembly;
    wherein the handle is moveable within the tailgate between a retracted position and an extended position;

wherein when the handle is in the extended position, the handle passes through an opening in a top surface of the tailgate and the handle is pivotable about the pivot pin to move to a support position; and wherein when the handle is in the support position, the locking pin releasably locks the handle in the support position, and the handle portion engages the tension link member and rotates the tension link member to contact a fixed surface or a tolerance compensator.

15. The tailgate of claim 14, further comprising a step assembly.

* * * * *